US006850618B1

(12) United States Patent
Mohajeri et al.

(10) Patent No.: US 6,850,618 B1
(45) Date of Patent: Feb. 1, 2005

(54) CENTRAL OFFICE INTERFACE TECHNIQUES FOR DIGITAL SUBSCRIBER LINES

(75) Inventors: Hessam Mohajeri, Los Altos Hills, CA (US); Serdar Kiykioglu, Plano, TX (US); Heron Babaei, San Jose, CA (US)

(73) Assignee: Centillium Communications, Inc., Fremont, CA (US)

(*) Notice: Subject to any disclaimer, the term of this patent is extended or adjusted under 35 U.S.C. 154(b) by 0 days.

(21) Appl. No.: 09/570,804

(22) Filed: May 15, 2000

(51) Int. Cl.[7] .............................. H04M 1/00; H04M 9/00
(52) U.S. Cl. .................. 379/399.01; 379/414; 375/222
(58) Field of Search ...................... 379/399.01, 399.02, 379/142.01, 93.08, 373.01, 414; 370/493, 252, 295; 375/222

(56) References Cited

U.S. PATENT DOCUMENTS

| | | | | |
|---|---|---|---|---|
| 1,501,691 A | * | 7/1924 | Vennes | 370/295 |
| 3,578,911 A | | 5/1971 | Bender et al. | 178/45 |
| 3,828,281 A | | 8/1974 | Chambers, Jr. | |
| 3,932,713 A | | 1/1976 | Fleuchaus et al. | 179/174 |
| 3,973,089 A | | 8/1976 | Puckette | |

(List continued on next page.)

FOREIGN PATENT DOCUMENTS

| | | |
|---|---|---|
| EP | 1 156 655 A2 | 11/2001 |
| EP | 1 175 077 A2 | 1/2002 |

OTHER PUBLICATIONS

Infineon Technologies AG—Products—B—MuSLIC, [online]. [Retrieved on May 17, 2001]. Retrieved from the Internet: <URL: http://www.infineon.com/cgi/ecrm.dll/ecrm/scripts/prod_ov.jsp?oid=13670>, 1 page.

Aalaei, et al., "Splitterless DSL and the Myth of Multi–Mode," White Paper, Sep. 1999, 8 pages. Retrieved from the Internet: <URL: http://www.infineon.com/cmc_upload/migrated_files/document_Others/Glite_wpl.pdf>.

ICs for Communications, "Broadband Multichannel Subscriber Line–Interface Circuits for Splitterless G.Lite Applications," Preliminary Product Overview 05.99, May 1999, pp. 1–51. Retrieved from the Internet: <URL: http://www.infineon.com/cmc_upload/migrated_files/document_files/Product_Family_Overview/bmsic_o.pdf>.

(List continued on next page.)

*Primary Examiner*—Minsun Oh Harvey
*Assistant Examiner*—Con P. Tran
(74) *Attorney, Agent, or Firm*—Fenwick & West LLP

(57) ABSTRACT

A splitterless interface between a digital subscriber line (DSL) and the central office equipment that can receive and isolate the low frequency voice data and high frequency digital data from a telephone line. This interface can also mix and transmit low frequency voice data and high frequency digital data onto a telephone line. For POTS band frequencies, a reactive impedance coupled across the two-wire interface of the POTS line card, and serially coupled to the line side of the DSL coupling transformer, has an open state magnitude. The magnitude of the line side windings of the DSL coupling transformer is low at POTS band frequencies. POTS band signal power is therefore delivered to the POTS line card. For DSL band frequencies, the reactive impedance across the two-wire interface of the POTS line card has a closed state magnitude. The POTS line card is therefore essentially short-circuited at DSL band frequencies, and DSL band signal power is delivered to the DSL modem. The frequency band in which the reactive impedance transitions from an open state magnitude to a closed state magnitude corresponds to the frequency band between the POTS frequency band and the DSL frequency band.

24 Claims, 3 Drawing Sheets

U.S. PATENT DOCUMENTS

| | | | |
|---|---|---|---|
| 4,046,969 A | 9/1977 | Dalley | 179/18 FA |
| 4,414,435 A | 11/1983 | Parlor | 179/81 R |
| 4,439,634 A * | 3/1984 | Blackburn | 455/401 |
| 4,443,882 A | 4/1984 | Rolfe et al. | 375/36 |
| 4,646,319 A | 2/1987 | Engel et al. | 375/7 |
| 4,764,922 A | 8/1988 | Dieter et al. | 370/123 |
| 4,899,382 A | 2/1990 | Gartner | 379/413 |
| 5,255,317 A | 10/1993 | Arai et al. | 379/399 |
| 5,343,520 A | 8/1994 | Willocx et al. | |
| 5,365,577 A | 11/1994 | Davis et al. | 379/96 |
| 5,408,260 A | 4/1995 | Arnon | 348/6 |
| 5,410,343 A | 4/1995 | Coddington et al. | 348/7 |
| 5,442,630 A | 8/1995 | Gagliardi et al. | 370/85 |
| 5,448,635 A | 9/1995 | Biehl et al. | 379/299 |
| 5,461,616 A | 10/1995 | Suzuki | 370/79 |
| 5,483,530 A | 1/1996 | Davis et al. | 370/79 |
| 5,504,807 A | 4/1996 | Sattler et al. | |
| 5,509,009 A | 4/1996 | Laycock et al. | 370/62 |
| 5,511,075 A | 4/1996 | Bhasker | 370/85.13 |
| 5,519,731 A | 5/1996 | Cioffi | 375/260 |
| 5,534,912 A | 7/1996 | Kostreski | 348/6 |
| 5,563,943 A | 10/1996 | Takebayashi et al. | 379/373 |
| 5,579,127 A | 11/1996 | Kaneko | 358/434 |
| 5,586,181 A | 12/1996 | Kiko | 379/399 |
| 5,587,735 A | 12/1996 | Ishida et al. | 348/14 |
| 5,610,922 A | 3/1997 | Balatoni | 370/486 |
| 5,621,359 A | 4/1997 | Evert | |
| 5,757,803 A | 5/1998 | Russell et al. | 370/494 |
| 5,815,505 A | 9/1998 | Mills | 370/522 |
| 5,841,841 A * | 11/1998 | Dodds et al. | 379/93.08 |
| 5,889,856 A | 3/1999 | O'Toole et al. | 379/399 |
| 5,910,970 A | 6/1999 | Lu | 375/377 |
| 5,949,085 A | 9/1999 | Barrett | |
| 5,970,088 A | 10/1999 | Chen | 375/222 |
| 5,987,061 A | 11/1999 | Chen | 375/222 |
| 5,999,563 A | 12/1999 | Polley et al. | 375/222 |
| 6,002,722 A | 12/1999 | Wu | 375/295 |
| 6,008,976 A | 12/1999 | Pisterzi | |
| 6,021,167 A | 2/2000 | Wu | 375/354 |
| 6,028,919 A | 2/2000 | Bingel et al. | 379/142 |
| 6,038,251 A | 3/2000 | Chen | 375/222 |
| 6,044,107 A | 3/2000 | Gatherer et al. | 375/222 |
| 6,055,268 A | 4/2000 | Timm et al. | 375/229 |
| 6,101,216 A | 8/2000 | Henderson et al. | |
| 6,137,839 A | 10/2000 | Mannering et al. | 375/260 |
| 6,141,377 A * | 10/2000 | Sharper et al. | 375/222 |
| 6,151,335 A | 11/2000 | Ko et al. | |
| 6,157,680 A | 12/2000 | Betts et al. | 375/285 |
| 6,161,392 A | 12/2000 | Jirnov et al. | 62/87 |
| 6,163,579 A | 12/2000 | Harrington et al. | 375/257 |
| 6,185,280 B1 | 2/2001 | Jarboe et al. | |
| 6,192,109 B1 | 2/2001 | Amrany et al. | 379/30 |
| 6,198,818 B1 | 3/2001 | Bingel | 379/399 |
| 6,240,129 B1 | 5/2001 | Reusens et al. | 375/222 |
| 6,240,179 B1 | 5/2001 | Balatoni et al. | 379/399 |
| 6,243,414 B1 | 6/2001 | Drucker et al. | 375/222 |
| 6,266,348 B1 * | 7/2001 | Gross et al. | 370/493 |
| 6,269,154 B1 | 7/2001 | Chellali et al. | |
| 6,295,343 B1 | 9/2001 | Hjartarson et al. | |
| 6,301,337 B1 | 10/2001 | Scholtz et al. | |
| 6,314,180 B1 | 11/2001 | Bingel | |
| 6,345,071 B1 | 2/2002 | Hamdi | |
| 6,373,277 B1 | 4/2002 | Felder | |
| 6,396,922 B1 | 5/2002 | Khuat | |
| 6,456,650 B1 | 9/2002 | Cheng et al. | |
| 6,520,744 B1 * | 2/2003 | Verbin et al. | 379/93.01 |
| 6,573,729 B1 | 6/2003 | Poulis et al. | |
| 2001/0012358 A1 | 8/2001 | Balatoni et al. | 379/399.01 |

OTHER PUBLICATIONS

Siemens, "Broadband–Multi Channel Subscriber Line Interface Concept," Product Brief B–MuSLIC, [online] Nov. 1998, 2 pages. Retrieved from the Internet: <URL:http//www.siemens.de/semiconductor/communication>.

"B–MuSLIC—A Unique Concept for Splitterless Integrated Voice–Data (IVD) Transmission," Nov. 1998, 11 pages. Retrieved from the Internet: <URL: http://www.infineon.com/cmc_upload/migrated_files/document_files/Others/bmsic_wp.pdf>.

Cook, et al., "ADSL and VADSL Splitter Design and Telephony Performance," *IEEE Journal on Selected Areas in Communications*, vol. 13, No. 9, Dec. 1995, pp. 1634–1642.

PCT International Search Report, International Application No. PCT/US02/39103, Mar. 28, 2003, 5 pages.

Liu, "Universal Filter Using Two Current–Feedback Amplifiers," Electronics Letters, vol. 13, No. 8, Apr. 13, 1995, pp. 629–630.

* cited by examiner

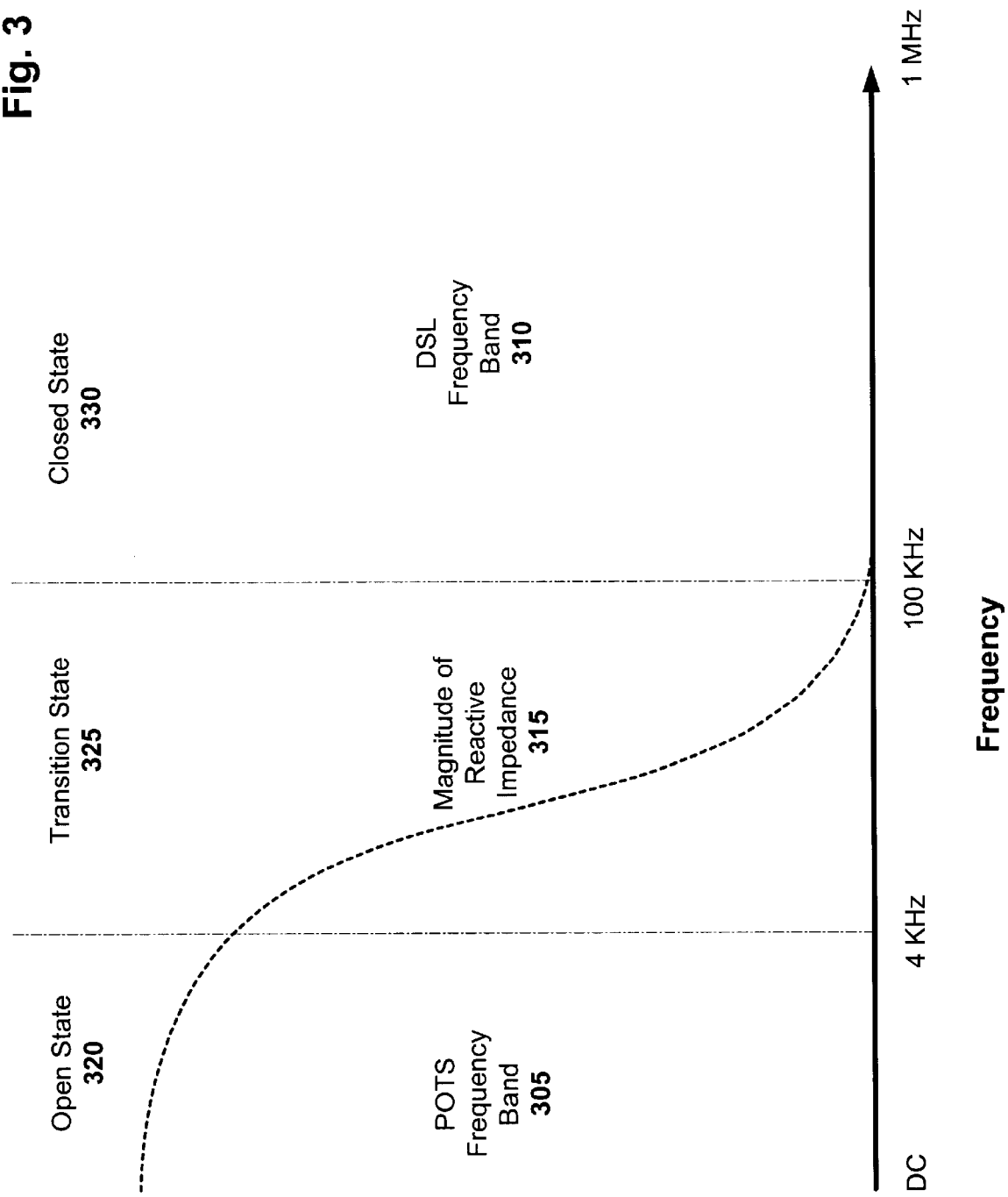

CENTRAL OFFICE INTERFACE TECHNIQUES FOR DIGITAL SUBSCRIBER LINES

BACKGROUND OF THE INVENTION

1. Field of the Invention

The invention relates to telecommunications, and more particularly, to a digital subscriber line interface between a telephone line and central office equipment of a network operator providing voice and digital subscriber services.

2. Description of the Related Art

The demand for more bandwidth on existing conventional telephone lines increases as more customers send and receive digital data over telephone lines. In general, a conventional telephone line is comprised of a pair of copper conductors that connect a telephone set to the nearest central office, digital loop carrier equipment, remote switching unit or any other equipment serving as the extension of the services provided by the central office. This pair of copper conductors, which is also referred to as a twisted pair, has its leads named as tip and ring. The tip and ring nomenclature is derived from the electrical contacts of an old-style telephone plug. Replacing these existing copper telephone lines with high-speed fiber optic cable is often found to be cost prohibitive. Additionally, an optical cable cannot deliver the electrical power necessary to run the voice and signaling circuitry of the connected equipment such as a conventional telephone set. The central office equipment, therefore, must provide such power. Moreover, substantial investments in the existing copper infrastructure by network operators generally necessitate continued use of that copper infrastructure. Thus, broadband technologies that can utilize existing copper telephone lines and co-exist with conventional narrowband analog phone service are highly desirable.

One such technology is the conventional integrated services digital network (ISDN). ISDN boosted transmission rates over existing copper telephone lines to 128 Kilobits per second (Kbps). Although voice data can be transmitted over an ISDN line, special terminal adapters that require an external power source must be provided in order to do so. When these requisite special terminal adapters fail because of a power outage, the ISDN line is rendered nonfunctional. This undesirable trait of ISDN lines is a particular problem should an emergency situation arise and a power outage has rendered the ISDN line useless for voice communication. In such a situation, lifeline telephone service would be disabled. As such, most ISDN lines are used in conjunction with a Plain Old Telephone Service (POTS) line. POTS lines are immune to power failures for extended time periods with back-up battery power provided by the phone service provider. Competing technologies that do not require a dedicated second line for failsafe voice telephony, therefore, are generally preferred over ISDN technology. Moreover, such competing technologies provide transmission rates superior to those offered by ISDN technology.

Another broadband technology that can utilize existing copper telephone lines is the digital subscriber line (DSL). Several variations of DSL technology are being developed, such as High-bit-rate DSL (HDSL), ISDN DSL (IDSL), Symmetric DSL (SDSL), Rate Adaptive DSL (RADSL), and asymmetric DSL (ADSL). ADSL is particularly attractive for consumer Internet applications where most of the data traffic is downstream towards the subscriber. For detailed descriptions of ADSL technology, see U.S. Pat. Nos. 5,461,616, 5,534,912, and 5,410,343.

Some DSL technologies, such as ADSL, have the advantage that ordinary voice data transmissions can share the same telephone line with digital data transmissions. The lower frequency band of the telephone line is used for voice data, while the upper frequency bands are used for digital data. However, because each of these frequency bands operates on the same phone line, DSL technology employs a splitter to isolate the signals of each band. In some applications, this splitter is comprised of two passive filters: (1) a low-pass filter that isolates the low-frequency components (POTS data) of the transmission, and (2) a high-pass filter that isolates the high-frequency components (digital data) of the transmission. The splitter also operates as a mixer to combine the high-frequency digital data with the low-frequency voice data, and provides the combined signal to the telephone line.

A problem with the DSL approach is that the passive elements (e.g., inductors and capacitors) that can be used to implement the low and high pass filters of the splitter are bulky and cumbersome. This added bulk requires more physical space to house the splitter, and consequently occupies more physical space in the central office of the telephone company. In the aggregate, the physical space consumption resulting from this approach is costly. Also, this approach is associated with additional material and manufacturing costs involved in building the splitters, as well as costs associated with deploying those splitters.

Another broadband technology that can utilize existing copper telephone lines to perform both the voice and digital data communication functions is the use of a silicon broadband subscriber line interface circuit (SLIC). This approach provides an active discrete splitter that is more compact than a passive splitter. However, such technology requires a high-voltage, high-speed silicon process and consumes significantly more power thereby limiting the service circuit line density. Moreover, this approach requires an additional power backup in order to sustain the supported communication channels for the same time period compared to that of a POTS only service in the event of a power failure.

Thus, what is needed is an interface between a telephone line and the central office that can receive and isolate low frequency POTS data and high frequency digital data from the telephone line. The interface should also be able to combine and transmit low frequency voice data and high frequency digital data onto a telephone line. The interface should be compact while at the same time provide the requisite filtering, and should have low-power consumption. Additionally, the interface should provide a POTS line that is immune to power failures.

BRIEF SUMMARY OF THE INVENTION

The techniques described here provide a splitterless central office interface for digital subscriber lines. One benefit of the techniques provided is that the amount of physical space needed to house the central office circuitry is reduced. Another benefit is that the costs associated with materials, manufacturing, deployment and maintenance are reduced.

One embodiment of the present invention employs a reactive impedance on the line side of the DSL coupling transformer. The POTS line card is connected across the reactive impedance. The reactive impedance provides a splitter function between the POTS and DSL circuits. The magnitude of the reactive impedance decreases as frequency increases effectively creating a short-circuit, whereas the magnitude of the reactive impedance increases as frequency decreases effectively creating an open-circuit. Thus, at low frequencies (e.g., POTS band frequencies), the magnitude of the reactive impedance represents an open state, and at high frequencies (e.g., DSL band frequencies), the magnitude of the reactive impedance represents a closed state. An opposite condition applies to the windings of the DSL coupling transformer. As frequency decreases, the magnitude of the windings' impedance (reactance of the magnetizing inductance) decreases, while as frequency increases the magnitude of the windings' impedance increases.

The line side windings of the DSL coupling transformer are effectively in series with the reactive impedance. For POTS band frequencies, the magnitude of the reactive impedance is in its high or open state, and the magnitude of the impedances of the windings are effectively short-circuits. As such, at POTS band frequencies, the POTS circuit interfaces with the line as if the DSL circuit is not present. For DSL frequencies, the magnitude of the reactive impedance is in its low or closed state, and the magnitudes of the impedances of the windings are effectively open-circuits. As such, at DSL band frequencies, the DSL circuit interfaces with the line as if the POTS circuit is not present. Thus, the reactive impedance provides the functionality of a splitter. Adverse effects of the reactive impedance on POTS transmission characteristics can be compensated for by a programmable CODEC.

The present invention can be implemented with a system independent of the type of ringing circuit employed by that system. In general, a ringing signal is applied to the POTS connecting equipment by the central office. For example, the ringing signal is applied to the ring conductor of the line, while the tip conductor is grounded as the return path. This causes a telephone set to ring. Relays are typically used to switch in the ringing signal while simultaneously switching out the POTS line card to isolate it from the ringing signal. Ringing generator specifications have been identified in applicable standards to have certain AC source impedance and DC resistance per lead. For example, details on ringing application specifications have been specified in Local Area Transport and Access (LATA) Switching Systems Generic Requirements (SSGR) (note that LATA SSGR is referred to as LSSGR); Bellcore's FR-NWT-000064—LSSGR module; and the subsequent references specified in Bellcore's FR-NWT-000064. Also, for digital loop carrier equipment, for example, ringing application specifications have been specified in Bellcore's TR-NWT-00057.

Ringing generators are generally common equipment in telecommunications equipment, and therefore can be used to simultaneously apply the ringing signal to multiple lines. This simultaneous application of the ringing signal should not have any adverse affect on the lines that are being rung. As stated earlier, a POTS circuit is isolated from the ringing signal by relays. As such, the simultaneous application of the ringing signal does not have any adverse affect on the various POTS circuits. On the other hand, a DSL circuit is not switched out by relays. Thus, various isolation methods (e.g., ringing inductors) have been developed to ensure that the DSL circuits are not cross-coupled with the ringing circuit. A reactive impedance coupled across the POTS circuit in accordance with one embodiment of the present invention also ensures that the DSL circuits are not cross-coupled with the ringing circuit. This is done without adversely affecting the performance of the ringing circuit or the isolation method employed. As such, the present invention can operate in a system independent of the ringing circuit, and therefore requires no additional circuitry hardware to deploy the invention regardless of the ringing circuit type.

More specifically, the ringing signal has a significantly low frequency thereby causing the magnitude of the reactive impedance to be in a high state. The line side windings of the DSL coupling transformer, on the other hand, do not pose any significant impedance value to limit the ringing signal. Therefore, the ringing signal is applied to the line as if it is directly coupled to the line. The DSL signal, however, is shunted by the high state magnitude of the reactive impedance. As such, there is a negligible differential signal left that is coupled to another line being rung. In short, as far as the ringing generator is concerned, the DSL circuit is effectively not present. Similarly, DSL frequency band signals cause the magnitude of the reactive impedance to be in a low state. As such, the POTS line card and ringing circuit are effectively isolated from DSL frequency band signals.

BRIEF DESCRIPTION OF THE DRAWINGS

FIG. 3 illustrates exemplar frequency ranges of POTS communication signals and DSL communication signals, and how each frequency range relates to the magnitude of a reactive impedance in accordance with one embodiment of the present invention.

DETAILED DESCRIPTION OF THE INVENTION

Figure 1:
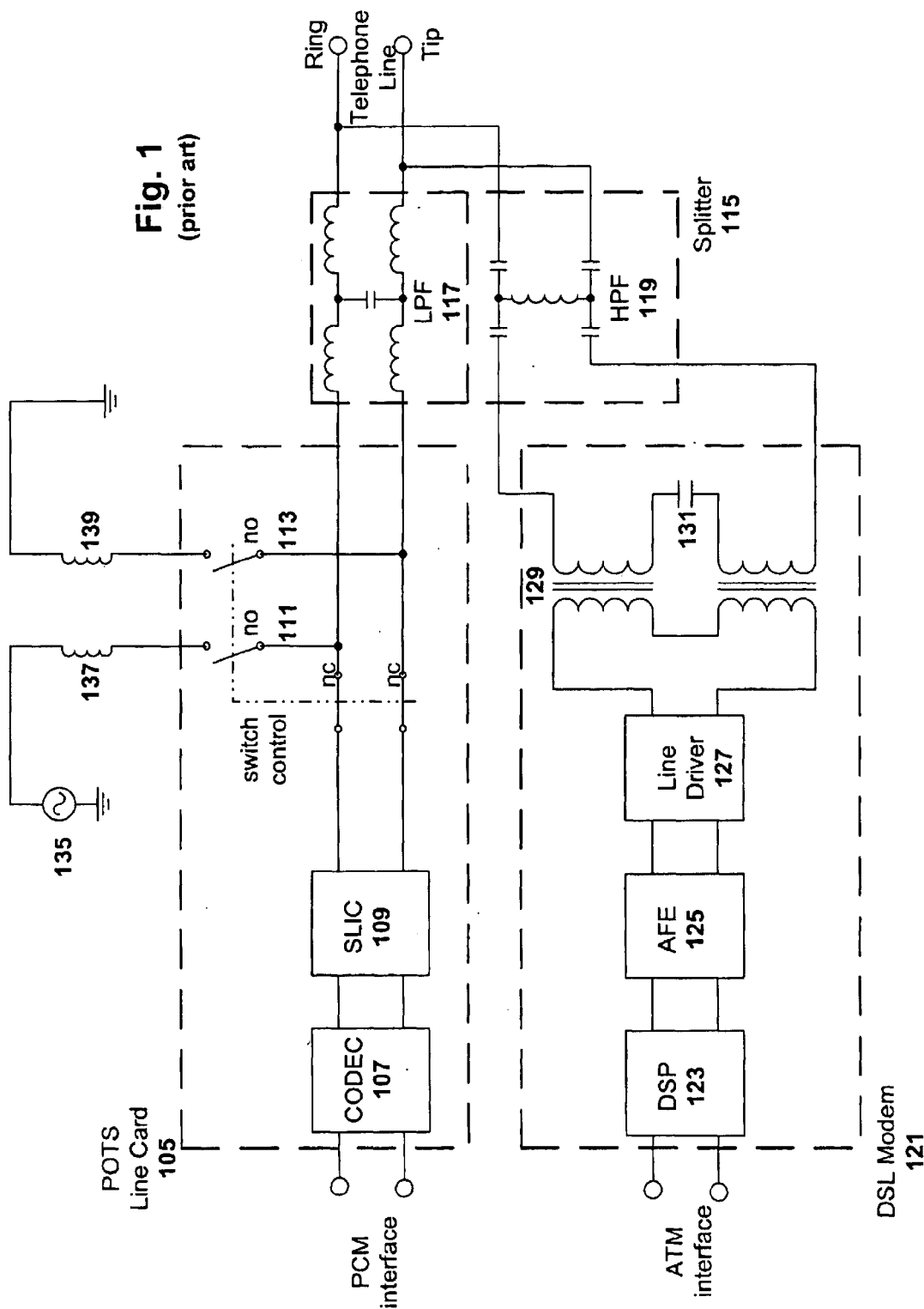
FIG. 1 is a block diagram of a conventional central office interface for a digital subscriber line.

FIG. 1 is a block diagram of a conventional central office interface for a digital subscriber line. The interface includes splitter 115, POTS line card 105 and DSL modem 121. Additionally included is a ringing circuit comprised of source 135, inductor 137 and inductor 139.

Splitter 115 is a conventional passive splitter and is used to couple the telephone line with the POTS line card 105 and the DSL modem 121. The splitter 115 is comprised of a low pass filter 117 and a high pass filter 119. Low pass filter 117 isolates the low frequency POTS signal (e.g., voice and fax data under 4 KHz) from the incoming telephone line, and provides that POTS signal to the POTS line card 105. High pass filter 119 isolates the high frequency DSL signal from the incoming telephone line, and provides that DSL signal to the DSL modem 121. Each of these filters can be implemented in a number of ways to be compliant with applicable splitter specifications. For example, low pass filter 117 can be a 5-pole filter comprised of four inductors and a capacitor as shown in FIG. 1, while high pass filter 119 can be a 5-pole filter comprised of four capacitors and an inductor as shown in FIG. 1. Those skilled in the art will recognize various filter configurations depending on, for example, the desired system performance and established industry standards.

POTS line card 105 is comprised of a subscriber line interface circuit (SLIC) 109 coupled to a programmable CODEC 107. Also included in POTS line card 105 are switches 111 and 113. The SLIC 109 is used for interfacing the telephone line with programmable CODEC 107, and may include, for example, DC signaling circuits to establish, control and terminate calls. It may also include a ring generator and or an off-hook detector. Those skilled in the art will recognize that CODEC is an acronym for coder and decoder.

In one respect, programmable CODEC 107 is used to convert analog POTS band signals received from the line to their digital equivalent. An analog to digital converter cu (ADC) is generally used to accomplish this conversion. In another respect, the CODEC is used to connect digital POTS band signals to their analog equivalent for transmission onto the line. A digital to analog converter (DAC) is generally used to accomplish this conversion. A CODEC may also have voice compression and decompression capabilities. A CODEC is typically available as an integrated circuit chip or component. CODEC 107 can be coupled with, for example, a PCM interface for transmission to other central offices or other networks. Those skilled in the art will recognize other interface protocols that can be implemented here as well.

Switches 111 and 113 are conventional relay-type switches. Although a switching scheme such as this can be implemented in a number of ways, the configuration shown represents two double-pole, single throw switches having a common control line. The switches are shown in their normally closed states. As such, filtered POTS data is coupled to SLIC 109 via the normally closed (nc) portions of each switch. However, during a ringing cycle, the switch control lines are activated (e.g., by SLIC 109) thereby energizing the relays. The normally closed portions of switches 111 and 113 then open, and the normally open (no) portions of those switches close. This switching action isolates the SLIC 109 from the circuit and introduces a ringing voltage to energize the ringing circuit. The ringing voltage, provided by source 135, is typically an AC voltage (e.g., 20 to 30 Hz at 84 to 104 Vrms) having a negative DC offset (e.g., −42.5 to −56 VDC). Inductors 137 and 139 can be used to provide the source impedance requirement as set by applicable standards, although those skilled in the art will recognize other isolation methods for ensuring that the DSL circuits are not cross-coupled with the ringing circuit. Once the ringing cycle is terminated (e.g., following ring trip or at the silent interval of a ringing cycle), then the switches 111 and 113 return to their de-energized positions.

DSL modem 121 is comprised of digital signal processor (DSP) 123, analog front-end (AFE) 125, line driver 127, and transformer 129. Transformer 129 includes DC blocking capacitor 131. DSL modem 121 can, for example, employ asymmetric DSL (ADSL) technology or G. Lite technology. Generally, this modem converts the analog voltage received from the line to its original digital form. This digital data can then be applied to a network or backbone for further processing or transmission. A typical protocol implemented in the transmission of this data is the asynchronous transfer mode (ATM). Those skilled in the art will recognize other protocols that can be implemented as well.

Transformer 129 is a balanced interface for coupling the line to the DSL circuitry. DC blocking capacitor 131 is connected between the windings on the line side of transformer 129. This DC blocking capacitor 131 prevents DC current from flowing through the line side of the transformer. Thus, any DC component of the signal received from the telephone line will not cause the DSL coupling transformer 129 to saturate. Recommendations G.992.1 and G.992.2 of the Telecommunications Standards Section of the International Telecommunication Union (sometimes designated as ITU-T) each define specifications for; such a DC blocking capacitor. Recommendations G.992.1 and G.992.2 also define an ADSL transceiver unit on the central office side, and an ADSL transceiver unit on the remote terminal or customer premises side. Each of these respective recommendations is herein incorporated by reference in its entirety.

Transformer 129 is coupled to line driver 127. Line driver 127 performs, for example, a 2-to-4 wire conversion, and provides filtering. Line driver 127 may also include a hybrid balance network. AFE 125 provides analog to digital conversion on the signal received from line driver 127, and is coupled to a DSP 123. DSP 123, which can be implemented in software, hardware, firmware or any combination thereof, is the engine used to implement filters and DSL protocols. DSP 123 can be coupled with an ATM interface to a high speed network backbone.

The preceding discussion was directed to data flowing from the telephone line through splitter 115 to either POTS line card 105 or DSL modem 121. Those skilled in the art understand that data on the telephone line is full duplex and bi-directional. As such, low frequency POTS data can be received by the CM or other suitable interface, converted to its analog equivalent by POTS line card 105, and applied to splitter 115. Likewise, high frequency packet data can be received by the ATM or other suitable interface, converted to its analog equivalent by DSL modem 121, and applied to splitter 115. When data is traveling in this direction, splitter 115 combines the low frequency voice data and the high frequency DSL data onto the telephone line.

Figure 2:
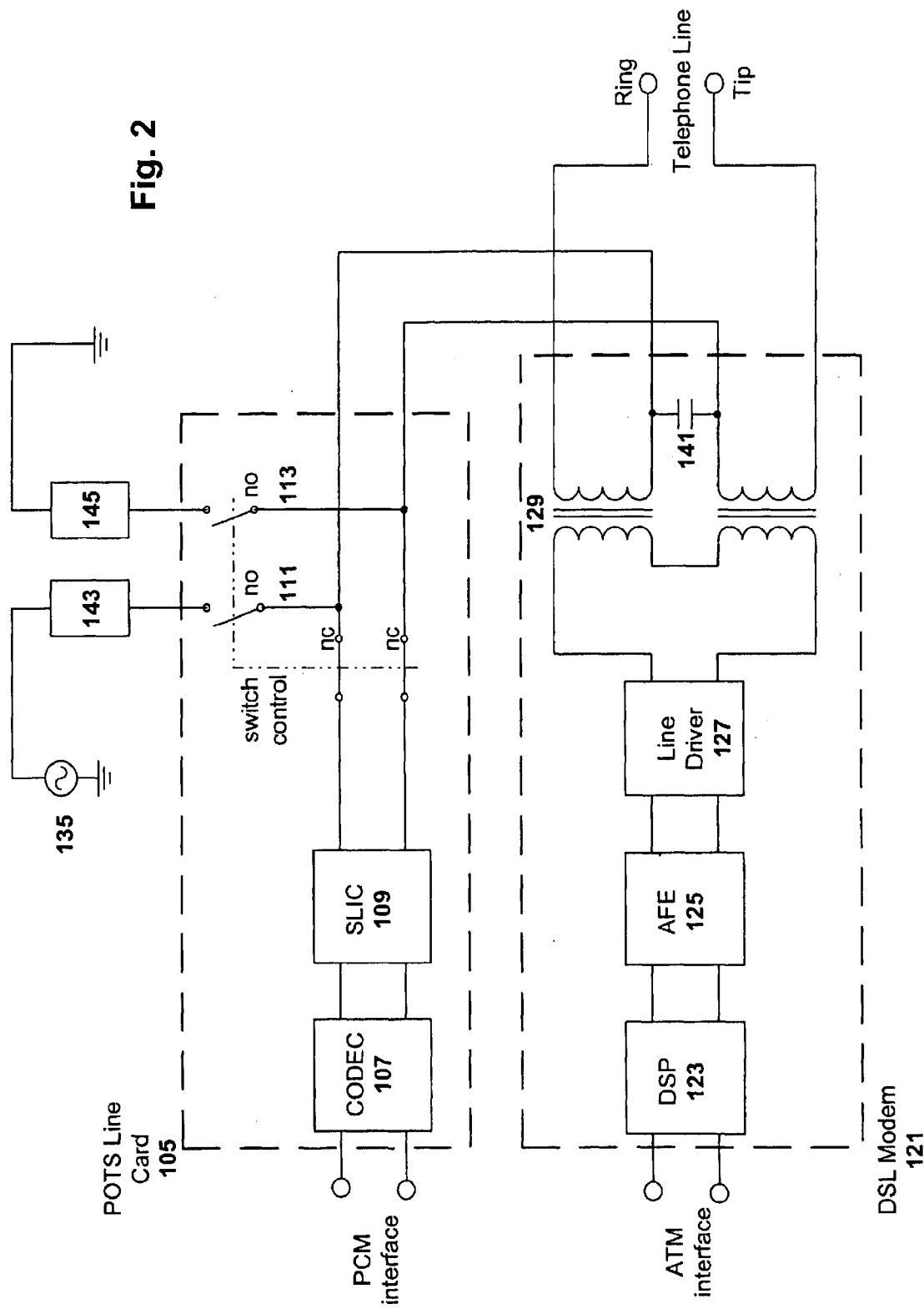
FIG. 2 is a block diagram of a central office interface for a digital subscriber line in accordance with one embodiment of the present invention.

FIG. 2 is a block diagram of a central office interface for a digital subscriber line in accordance with one embodiment of the present invention. The interface includes POTS line card 105 and DSL modem 121. Additionally included is a ringing circuit comprised of source 135, coupler 143 and coupler 145. POTS line card 105 and DSL modem 121 can be implemented, for example, on a single discrete chip, or separately on individual chips (e.g., a chip set comprised of a number of chips).

Splitterless Interface

There is no splitter 115 in this embodiment, and the telephone line is applied directly across the line side of transformer 129 of the DSL modem 121. As earlier stated, transformer 129 is a balanced interface for coupling the line to the DSL circuitry. Moreover, transformer 129 physically isolates the DSL circuitry from the line. A reactive impedance 141 is serially coupled to the line side of transformer 129. This reactive impedance 141 provides an impedance having a magnitude that decreases as signal frequency increases. In one embodiment, reactive impedance 141 is a capacitor having a value in a range as specified by recommendations G.992.1 and G.992.2. In this embodiment, this capacitor also functions as a DC blocking capacitor for preventing any DC component of the signal received from the telephone line from saturating transformer 129.

In the embodiment shown, the two-wire interface of the POTS line card 105 is connected across reactive impedance 141. Typically, the structural impedance of a central office POTS line card is approximately 900 ohms. Connecting the reactive impedance 141 across the two-wire interface of the POTS line card causes a two-wire and four-wire line impedance mismatch and degraded transmission characteristics as set forth by the applicable standards (e.g., Bellcore or equivalent standards), resulting in a less the optimal sound quality of the POTS communication channel. However, this impedance mismatch can be compensated for by properly programming the CODEC 107 by synthesizing the proper two-wire and four-wire impedance, and the proper transmit and receive path frequency equalization.

Those skilled in the art will understand that the programmable CODEC 107 can be programmed to synthesize desired transmission characteristics by employing a built-in DSP filter circuitry within the CODEC. CODEC 107 can also be programmed to compensate for physical components connected to the two-wire interface of the POTS line card 105. In general, a software tool with integrated circuit simulation program (e.g., PSPICE) is available from the supplier of a CODEC. This program can be used to calculate and simulate the necessary DSP code to implement the desired transmission characteristics without employing any additional hardware circuitry to an existing POTS design. In short, once desired transmission characteristics are identified and the physical circuit network is modeled, the simulation program can be used to obtain the desired performance from the POTS circuit.

Splitterless Interface Operates Independent of Ringing Circuit

In the embodiment shown in FIG. 2, the ringing circuit includes coupler 143 and coupler 145. These couplers may be inductors as previously explained. For example, coupler 143 may be equivalent to inductor 137 of FIG. 1, and coupler 145 may be equivalent to inductor 139 of FIG. 1. However, other ringing circuits and isolation methods can be employed depending on the particular specification being implemented. The POTS line card 105 and the ringing voltage provided by source 135 are connected across the reactive impedance 141, which has an open state magnitude at the ringing voltage frequency. In detail, the time-domain, instantaneous amplitude of the ringing signal voltage, applied across the complex network of the transformer magnetizing inductance in series with the reactive impedance 141, appears mostly across the reactive impedance 141. As such, an electrical gateway provided by the reactive impedance 141 delivers the signal power to the POTS circuit, and not across the windings of the transformer. As such, the ringing frequency will not manifest on the circuit side of transformer so 129. With respect to DSL band frequencies, the reactive impedance 141 has a closed state magnitude. As such, the ringing circuit is effectively short-circuited at DSL band frequencies thereby inhibiting DSL frequency band signals from being delivered to the ringing circuit.

Ideally, reactive impedance 141 would be a perfect open-circuit (e.g., impedance with infinite magnitude) at frequencies in the POTS band, and would be a perfect short-circuit (e.g., impedance with zero magnitude) at frequencies in the DSL bands. The line side of transformer 129, therefore, would be open-circuited by reactive impedance 141 at POTS band frequencies, and the POTS line card 105 would consequently receive the entire POTS signal power from the telephone line. On the other hand, the POTS line card 105 would be short-circuited by reactive impedance 141 at DSL band frequencies, and the DSL modem would consequently receive the entire DSL signal power from the telephone line.

In one embodiment, reactive impedance 141 is implemented by a capacitor that is specified in the ITU-T recommendations such as G992.1 and G.992.2. The gap in the frequency spectrum between the POTS band and the DSL band provides the reactive impedance 141 an inter-state range for transitioning from an impedance having a high magnitude to an impedance having a low magnitude. In the embodiment shown, an incoming phone voice call on a DSL can still be received even when the power fails. This is because, in this embodiment, reactive impedance 141 is comprised of a passive component (e.g., a capacitor) that does not require external power. Thus, a single DSL can serve as an emergency POTS line. POTS is provided in the conventional manner, and therefore the requirement for emergency battery back-up power for maintaining the lifeline POTS is satisfied. DSL service, however, is now embedded on the same telephone cable.

The preceding discussion was directed to data flowing from the telephone line to the primary side of transformer 129, and from the reactive impedance 141 to the POTS line card 105. Those skilled in the art understand that data on the telephone line is full duplex and bi-directional. As such, low frequency POTS data can be received by the PCM interface, converted to its analog equivalent by POTS line card 105, which is connected across the reactive impedance 141, and applied to the telephone line. Likewise, high frequency packet data can be received by the ATM interface, converted to its analog equivalent by DSL modem 121, and applied to the telephone line via the circuit side of transformer 129. When data is traveling in this direction, the low frequency voice data and the high frequency DSL data are combined onto the telephone line at the line side of transformer 129.

FIG. 3 illustrates exemplar frequency ranges of POTS communication signals and DSL communication signals, and how each frequency range relates to the magnitude of a reactive impedance in accordance with one embodiment of the present invention. A conventional copper telephone line is capable of transmission above the POTS frequency band where the usable frequency spectrum depends on the line conditions (i.e. bridge taps, noise and crosstalk), transmission frequency, and wire gauge.

POTS frequency band 305 ranges from approximately DC to 4 KHz. Public switched telephone network (PSTN) and supporting local access networks operate in POTS frequency band 305. Transfer rates in this frequency range are approximately 56 Kbps or less. The DSL frequency band 310, in this example, ranges from approximately 100 KHz up to 1 MHz. Those skilled in the art understand that some DSL technologies provide separate bands for upstream data and downstream data. For example, an ADSL upstream data channel might operate within a frequency spectrum ranging from approximately 85 to 95 KHz. A transfer rate in this frequency so spectrum can occur at up to approximately 2 Mbps. An ADSL downstream data channel might operate within a frequency spectrum ranging from approximately 100 KHz to 500 KHz. Data transfer rates to the customer in such a band may occur at up to approximately 9 Mbps.

Also shown in FIG. 3 is the magnitude of a reactive impedance 315 relative to frequency bands 305 and 310. This reactive impedance 315 can be, for example, serially connected to the line side of a DSL coupling transformer as reactive impedance 141 is shown in FIG. 2. As the frequency increases, the magnitude of the reactive impedance 315 decreases. In the embodiment shown, the reactive impedance 315 has a high magnitude region referred to as open state 320, a transition region referred to as state 325, and a low magnitude region referred to as closed state 330. The open state 320 corresponds to magnitudes of reactive impedance 315 that are responsive to signals in the POTS frequency band 305. POTS signals are intended to be received by, for example, a POTS line card or its equivalent. The closed state 330 corresponds to magnitudes of reactive impedance 315 that are responsive to signals in the DSL frequency band 310. Such signals are intended to be received by, for example, a DSL modem or its equivalent. The transition state 325 corresponds to magnitudes of reactive impedance 315 that are responsive to signals in the frequency band between the highest POTS band 305 frequency (e.g., 4 KHz) and the lowest DSL band 310 frequency (e.g., 100 KHz). Thus, reactive impedance 315 can have an open state magnitude, a closed state magnitude, or a transition state magnitude.

In one embodiment, reactive impedance 315 is provided by a capacitor ranging from approximately 27 microfarads to 47 nanofarads. However, the value of the capacitor depends on factors such as the applicable specification or ITU recommendation and the particular application. Thus, the above range is not intended as a limitation, but merely as an example range. The type of capacitor may be a 250 volt metalized polyester self-healing capacitor, although those skilled in the art will recognize that the type of capacitor can vary depending, for instance, on the particular application. The magnitude of the impedance of the capacitor can be calculated by the equation: $1/(2*\pi*F*C)$ where F is the frequency of the signal applied to the capacitor, and C is the value of the capacitor. For example, the magnitude of the impedance of a 0.3 microfarad capacitor at 2 KHz is approximately 265 ohms. The magnitude of the impedance of that capacitor at 4 KHz is approximately 133 ohms. The magnitude of the impedance of that capacitor at 100 KHz is approximately 5 ohms. The magnitude of the impedance of that capacitor at 500 KHz is approximately 1 ohm. In this embodiment then, the open state 320 of the reactive impedance 315 would provide an impedance having a magnitude of approximately 133 ohms or greater, while the closed state 330 would provide an impedance having a magnitude of approximately 5 ohms or less.

Depending on what state the magnitude of reactive impedance 315 is in at any one frequency, a portion of the signal power corresponding to that frequency will be delivered to a POTS line card means. Likewise, a portion of the signal power corresponding to that frequency will be delivered to a DSL modem means. As the magnitude of reactive impedance 315 decreases at increasing frequencies, the greater the portion of the signal power corresponding to those frequencies that is delivered to the DSL modem means, and less signal power corresponding to those frequencies is delivered to the POTS line card means. On the other hand, as the magnitude of reactive impedance 315 increases at decreasing frequencies, the greater the portion of the signal power corresponding to those frequencies that is applied to the POTS band line card means, and less signal power corresponding to those frequencies is delivered to the DSL modem means.

Impedance 315 can be implemented so as to optimize the amount of signal power at any one frequency that is to be delivered to one of the POTS line card means and the DSL modem means. Optimal amounts, for example, might correlate to the smallest portion of DSL band signal power being delivered to the POTS line card given a particular frequency spectrum. Conversely, an optimal amount might correlate to the smallest portion of POTS band signal power being delivered to the DSL modem given a particular frequency spectrum. Those skilled in the art understand that the particular frequency spectrum is dependent, for example, on the type of DSL modem employed, the system bandwidth requirements for upstream and downstream communication channels, and the frequency range of those communication channels.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for interfacing a telephone line having a first wire and a second wire with a central office, the system comprising:
   a DSL modem connected to a coupling transformer having a line side and a circuit side, the modem for processing DSL frequency band signals received from the telephone line, wherein the line side of the transformer is coupled between the first and second wires of the telephone line;
   a reactive impedance serially coupled to the line side of the transformer, the reactive impedance having a magnitude that decreases as signal frequency increases;
   a POTS line card having a two-wire interface, and for processing POTS frequency band signals received from the telephone line, wherein the two-wire interface of the POTS line card is operatively coupled across the reactive impedance.

2. The system of claim 1 wherein the reactive impedance has an open state magnitude in response to POTS frequency band signals.

3. The system of claim 1 wherein the reactive impedance has a closed state magnitude in response to DSL frequency band signals.

4. The system of claim 1 wherein the POTS line card includes a CODEC that is programmed to compensate for effects the reactive impedance has on POTS band structural impedance.

5. The system of claim 1 further comprising:
   a ringing circuit coupled to the POTS line card for ringing a telephone set on the telephone line wherein, responsive to a ringing signal from the ringing circuit, the reactive impedance has an open state magnitude.

6. The system of claim 1 further comprising:
   a ringing circuit coupled to the POTS line card for ringing a telephone set on the telephone line wherein, responsive to receiving DSL frequency band signals, the reactive impedance has a closed state magnitude thereby inhibiting the DSL frequency band signals from being delivered to the ringing circuit.

7. The system of claim 1 wherein at least a portion of the system is implemented by one or more integrated circuit chips.

8. A method for interfacing a telephone line having a first wire and a second wire with a central office, the method operating in a system comprising a reactive impedance that is operatively coupled to a two-wire interface of a POTS line card, wherein the reactive impedance is serially coupled to a line side of a coupling transformer, and the line side of the coupling transformer is connected between the first and second wires of the telephone line, the method comprising:
   receiving at the POTS line card a first signal having a first frequency that causes the reactive impedance to have an open state magnitude thereby inhibiting the first signal from being transferred from the line side of the transformer to a circuit side of the transformer; and
   receiving at a DSL modem that is connected to the circuit side of the coupling transformer a second signal having a second frequency that causes the reactive impedance to have a closed state magnitude thereby inhibiting the second signal from being delivered to the POTS line card.

9. A method for interfacing a telephone line having a first wire and a second wire with a central office, the method operating in a system comprising a reactive impedance that is operatively coupled to a two-wire interface of a POTS circuit, wherein the reactive impedance is serially coupled to a line side of a coupling transformer, the line side of the transformer being connected between the first and second wires of the telephone line, the method comprising:
   responsive to a first signal having a POTS band frequency, providing an open state magnitude of the reactive impedance thereby allowing power of the first signal to be delivered to the POTS circuit; and responsive to a second signal having a DSL band frequency, providing a closed state magnitude of the reactive impedance thereby inhibiting the second signal from being delivered to the POTS circuit.

10. The method of claim 9 wherein providing a closed state magnitude of the reactive impedance in response to the second signal inhibits the second signal from being delivered to a ringing circuit coupled to the POTS circuit, and allows power of the second signal to be delivered to a DSL modem circuit.

11. A method for interfacing a telephone line having first and second wires with a POTS circuit having a two-wire interface, wherein a DC blocking capacitor of a coupling transformer is operatively coupled across the two-wire interface of the POTS circuit, the method comprising:

responsive to a first signal having a POTS band frequency, providing an open state magnitude of the DC blocking capacitor thereby allowing power of the first signal to be delivered to the POTS circuit; and responsive to a second signal having a DSL band frequency, providing a closed state magnitude of the DC blocking capacitor thereby inhibiting power of the second signal from being delivered to the POTS circuit.

12. The method of claim 1 further comprising:

compensating for effects of the DC blocking capacitor operatively coupled across the two-wire interface of the POTS circuit with a CODEC included in the POTS circuit.

13. The method of claim 11 wherein providing a closed state magnitude of the DC blocking capacitor in response to the second signal inhibits power of the second signal from being delivered to a ringing circuit coupled to the POTS circuit.

14. A system for interfacing a telephone line having a first wire and a second wire with a central office, the system comprising:

a first signal processor for receiving a high frequency analog signal from the telephone line, the first signal processor including a transformer having a line side that is coupled between the first and second wires of the telephone line;

a reactive impedance serially coupled to the line side of the transformer, the reactive impedance for providing an impedance having a magnitude that decreases as signal frequency increases; and a second signal processor for receiving a POTS band analog signal from the telephone line, the second signal processor having a two-wire interface, and the reactive impedance is coupled across the two-wire interface.

15. The system of claim 14 wherein the reactive impedance has an open state magnitude in response to receiving the POTS band analog signal thereby allowing power of the POTS band analog signal to be delivered to the second signal processor.

16. The system of claim 14 wherein the reactive impedance has a closed state magnitude in response to the high frequency analog signal thereby allowing power of the high frequency analog signal to be delivered to the first signal processor.

17. The system of claim 14 wherein the second signal processor includes a CODEC that is programmed to compensate for the reactive impedance coupled across the two-wire interface of the second signal processor.

18. A system for interfacing a telephone line having a first wire and a second wire with a central office, the system comprising:

a transformer having its line side coupled between the first and second wires of the telephone line, the transformer for decoupling DSL circuitry from the telephone line;

a capacitor serially coupled between first and second line side windings of the transformer; and a POTS circuit having the capacitor coupled across its two-Wire interface, the POTS circuit for processing POTS frequency band signals received from the telephone line.

19. The system of claim 18 wherein the capacitor has an open state magnitude in response to POTS frequency band signals.

20. The system of claim 18 wherein the capacitor has a closed state magnitude in response to DSL frequency band signals.

21. The system of claim 18 wherein the POTS circuit includes a CODEC that is programmed to compensate for effects of the capacitor coupled across the two-wire interface of the POTS circuit.

22. The system of claim 18 wherein the POTS circuit includes a SLIC.

23. A method for interfacing a telephone line having a first wire and a second wire with a central office, the method operating in a system comprising a capacitor that is coupled across the two-wire interface of a POTS circuit, wherein the capacitor is serially coupled between first and second line side windings of a DSL coupling transformer, the method comprising:

responsive to a first signal having a POTS band frequency, providing an open state magnitude of the capacitor thereby allowing power of the first signal to be delivered to the POTS circuit; and responsive to a second signal having a DSL band frequency, providing a closed state magnitude of the capacitor thereby inhibiting power of the second signal from being delivered to the POTS circuit.

24. A method for filtering POTS and DSL data received from a telephone line using a DSL coupling transformer and its DC blocking capacitor, the method comprising:

isolating the POTS data by virtue of the POTS data causing the DC blocking capacitor to have an open state magnitude thereby inhibiting the POTS data from being delivered to DSL circuitry; and isolating the DSL data by virtue of the DSL data causing the DC blocking capacitor to have a closed state magnitude thereby inhibiting the DSL data from being delivered to POTS circuitry.

* * * * *

UNITED STATES PATENT AND TRADEMARK OFFICE
CERTIFICATE OF CORRECTION

PATENT NO. : 6,850,618 B1
DATED : February 1, 2005
INVENTOR(S) : Hessam Mohajeri, Serdar Kiykioglu and Heron Babaei It is certified that error appears in the above-identified patent and that said Letters Patent is hereby corrected as shown below:

Column 10,
Line 7, please add "and" after "increases;"; and

Column 11,
Line 26, please change "1" to -- 11 --.

Signed and Sealed this

Twenty-sixth Day of July, 2005

JON W. DUDAS
*Director of the United States Patent and Trademark Office*